US008540324B2

(12) United States Patent
Leiber et al.

(10) Patent No.: US 8,540,324 B2
(45) Date of Patent: Sep. 24, 2013

(54) PRESSURE MODULATOR CONTROL

(75) Inventors: Heinz Leiber, Oberriexingen (DE); Thomas Leiber, München (DE)

(73) Assignee: IPGate AG, Zurich (CH)

( * ) Notice: Subject to any disclaimer, the term of this patent is extended or adjusted under 35 U.S.C. 154(b) by 867 days.

(21) Appl. No.: 11/912,290

(22) PCT Filed: Apr. 20, 2006

(86) PCT No.: PCT/EP2006/003648
§ 371 (c)(1),
(2), (4) Date: Jun. 25, 2008

(87) PCT Pub. No.: WO2006/111393
PCT Pub. Date: Oct. 26, 2006

(65) Prior Publication Data
US 2009/0115247 A1  May 7, 2009

(30) Foreign Application Priority Data

Apr. 21, 2005  (DE) ..................... 20 2005 018 018 U
Nov. 21, 2005  (DE) ......................... 10 2005 055 751

(51) Int. Cl.
*B60T 8/32* (2006.01)
(52) U.S. Cl.
USPC ............... 303/154; 303/113.4; 303/113.5; 303/114.2; 303/115.2; 303/116.1; 303/125; 303/155
(58) Field of Classification Search
USPC ............ 303/154, 155, 3, 146, 14, 9.27, 15, 303/114.1, 114.2, 115.2
See application file for complete search history.

(56) References Cited

U.S. PATENT DOCUMENTS

| 4,655,512 A | 4/1987 | Leiber |
| 4,660,897 A | 4/1987 | Leiber |

(Continued)

FOREIGN PATENT DOCUMENTS

| DE | 7113779 U | 11/1972 |
| DE | 2948088 A1 | 6/1981 |

(Continued)

OTHER PUBLICATIONS

International Search Report No. PCT/EP2006/003648, dated Jul. 7, 2006, 3 pgs.

(Continued)

*Primary Examiner* — Robert A Siconolfi
*Assistant Examiner* — San Aung
(74) *Attorney, Agent, or Firm* — Novak Druce Connolly Bove + Quigg LLP

(57) ABSTRACT

The invention relates to a brake system which comprises an actuating device (26), especially a brake pedal (30), and a control/regulation device (22). Said control/regulation device (22) controls at least one electromotive drive device (7a, 7b, 8) in response to the movement and/or position of the actuating device (26). The drive device adjusts a piston (1, 1a, 1b) of a piston/cylinder system via a non-hydraulic transmission device, thereby adjusting a pressure in the working compartment (4', 4'a, 4b') of the cylinder. Said working compartment is connected to a wheel brake (15, 17) via a pressure conduit (13, 13a). A valve (14, 14a, 15, 15a, 14', 14a') is interposed between the brake cylinder of the wheel brake and the working compartment of the piston/cylinder system. The control/regulation device opens the valve for pressure suppression or pressure build-up in the brake cylinder and closes it in order to maintain the pressure in the brake cylinder.

42 Claims, 10 Drawing Sheets

(56) References Cited

U.S. PATENT DOCUMENTS

| | | | |
|---|---|---|---|
| 4,702,531 A | 10/1987 | Kircher et al. | |
| 4,824,186 A * | 4/1989 | Leiber et al. | 303/114.2 |
| 5,147,117 A * | 9/1992 | Quinn | 303/115.2 |
| 5,246,281 A * | 9/1993 | Leppek | 303/114.1 |
| 5,302,008 A | 4/1994 | Miyake et al. | |
| 5,499,865 A * | 3/1996 | Katagiri et al. | 303/115.2 |
| 5,597,214 A * | 1/1997 | Katagiri et al. | 303/10 |
| 5,961,188 A * | 10/1999 | Sawada | 303/113.5 |
| 2002/0099489 A1* | 7/2002 | Polzin | 701/83 |
| 2002/0158510 A1* | 10/2002 | Kobayashi et al. | 303/155 |
| 2003/0160503 A1 | 8/2003 | Riddiford et al. | |
| 2003/0201669 A1* | 10/2003 | Yokoyama et al. | 303/113.4 |
| 2006/0163941 A1* | 7/2006 | Von Hayn et al. | 303/155 |

FOREIGN PATENT DOCUMENTS

| | | |
|---|---|---|
| DE | 3317629 A1 | 11/1984 |
| DE | 33 42 552 | 6/1985 |
| DE | 3440972 A1 | 5/1986 |
| DE | 3446824 A1 | 6/1986 |
| DE | 3632836 A1 | 3/1988 |
| DE | 3723916 A1 | 1/1989 |
| DE | 4114734 A1 | 11/1992 |
| DE | 4229041 A1 | 3/1993 |
| DE | 4229042 A1 | 3/1993 |
| DE | 44 45 975 | 6/1996 |
| DE | 197 53 786 | 6/1999 |
| DE | 10116755 A1 | 9/2002 |
| DE | 103 18 401 | 12/2003 |
| WO | WO-2004/005095 | 1/2004 |

OTHER PUBLICATIONS

English language translation of the International Preliminary Report on Patentability issued in corresponding International Application No. PCT/EP2006/003648.

\* cited by examiner

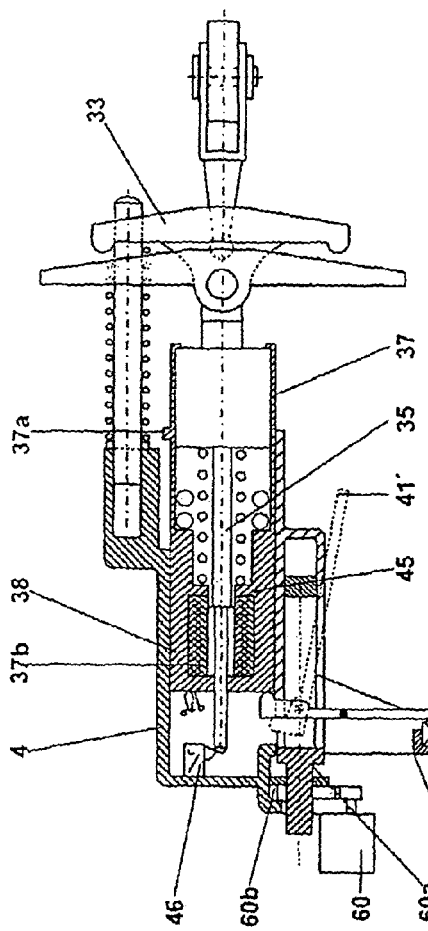
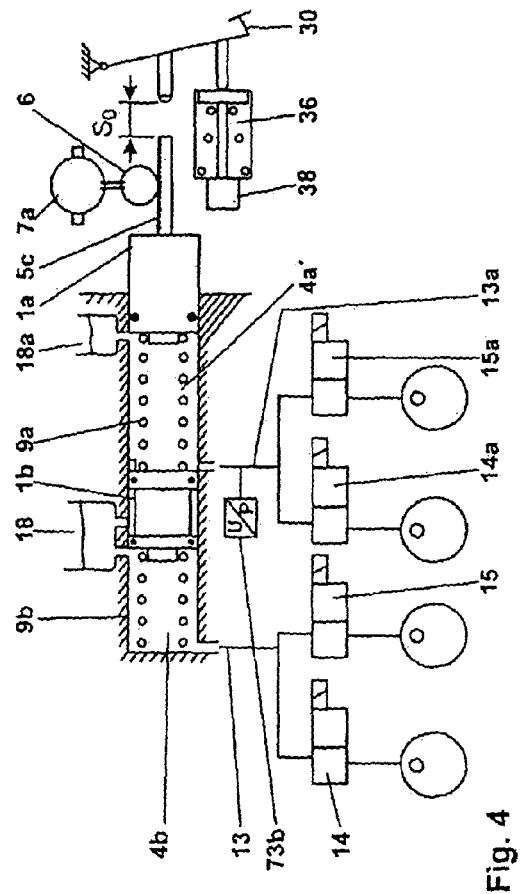
Fig. 3
Fig. 4

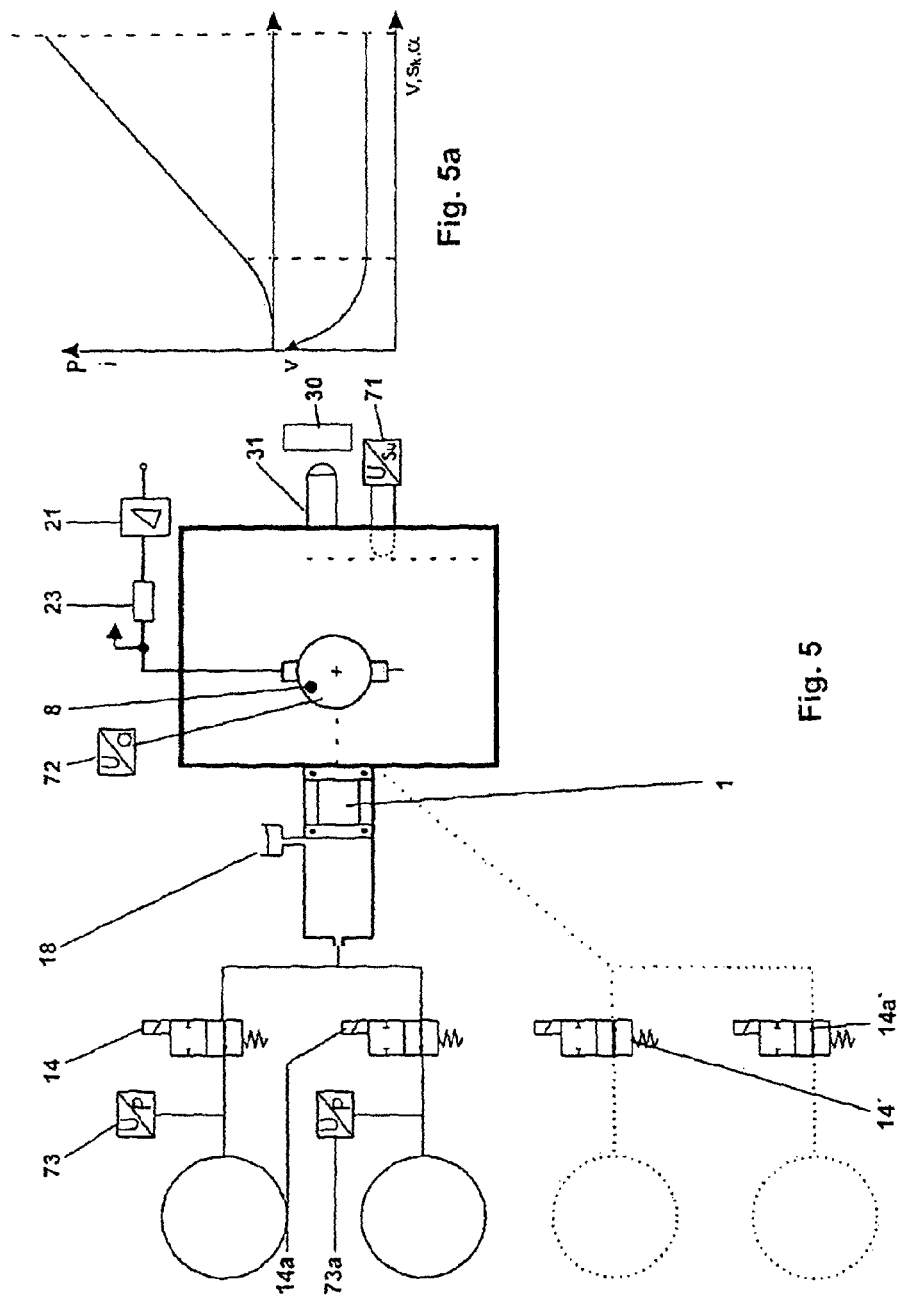

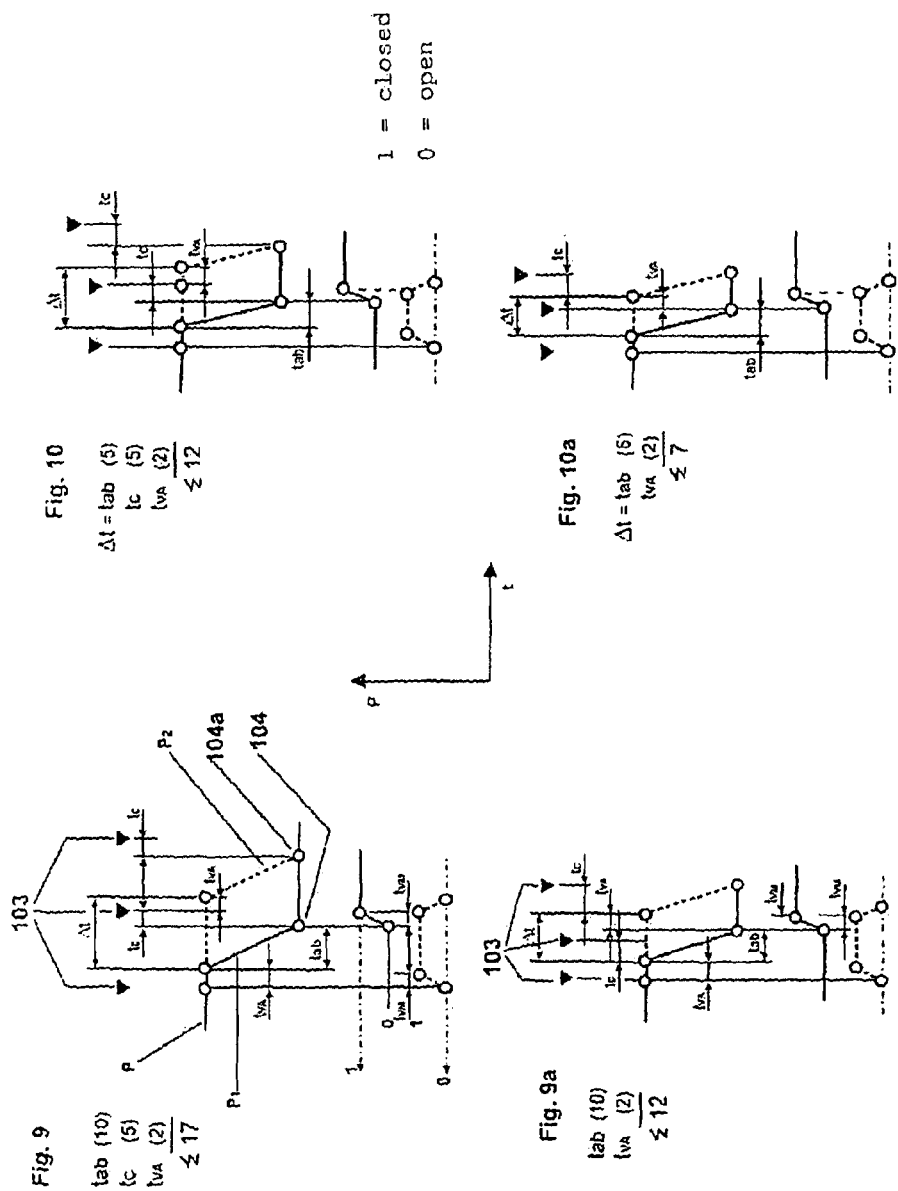

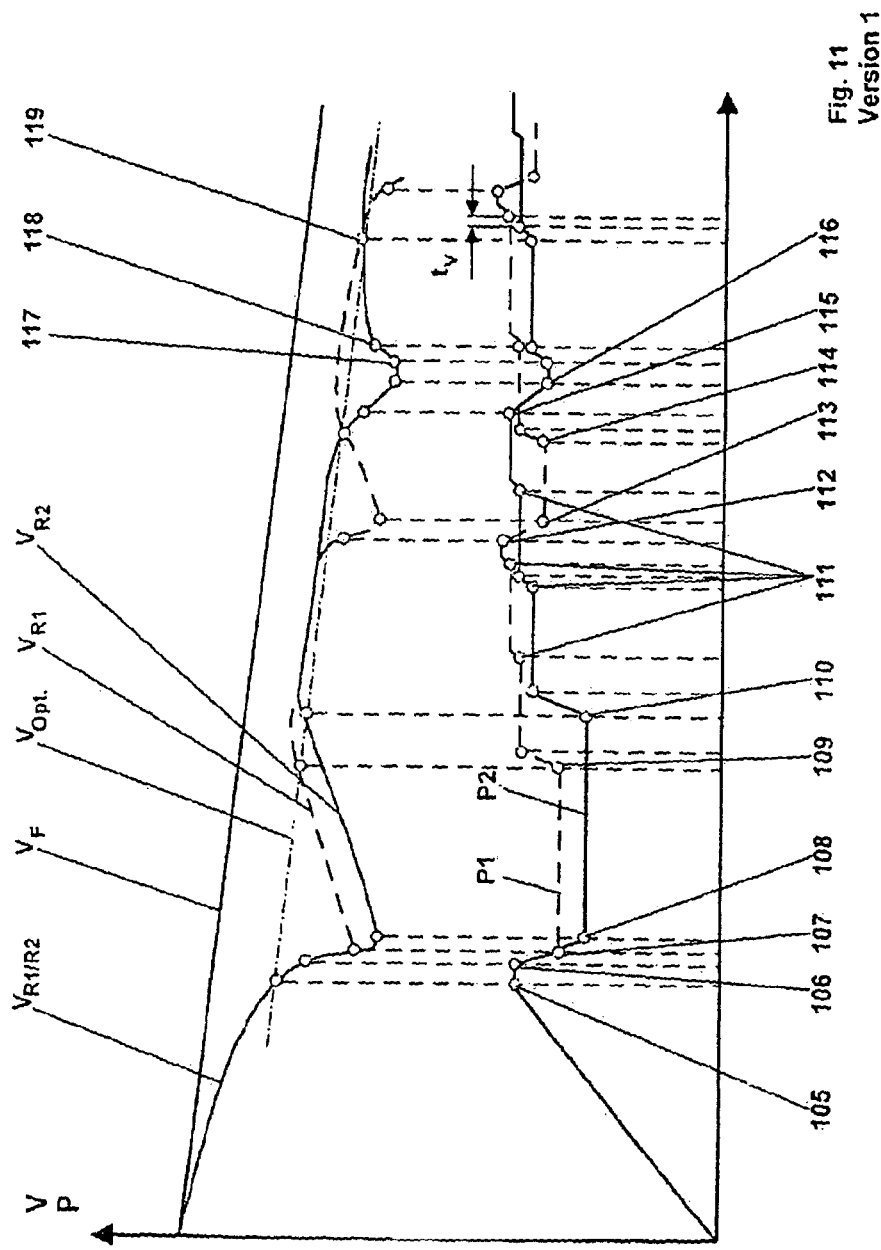

PRESSURE MODULATOR CONTROL

The present invention relates to a brake system, comprising an actuating device, in particular a brake pedal, and a control and regulating device, the control and regulating device controlling an electromotive drive device using the movement and/or position of the actuating device, the drive device adjusting a piston of a piston-cylinder system via a non-hydraulic gearing device, so a pressure is adjusted in the working chamber of the cylinder, the working chamber being connected to a wheel brake by a pressure line.

PRIOR ART

Modern brake systems comprise power-assisted braking, i.e. conversion of the pedal force into a correspondingly boosted braking torque at the wheel brakes and braking force regulation by way of open or closed regulating and control circuits. Except for in a few cases in the automobile sector the hydraulic line is used as the transmitting means to generate the braking pressure from the pedal force.

A division into modular units between power-assisted braking (PAB) or braking force control and braking force regulation in a hydraulic unit (HU) is widely used. This configuration is predominantly used in systems such as antilock braking systems (ABS), antislip regulation (ASR), electronic stability programs (ESP) or electrohydraulic brakes (EHB).

The hydraulic unit (HU) comprises solenoid valves, multi-piston pumps for 2-circuit brake systems, electric motor for pump drive, hydraulic reservoir and a plurality of pressure transducers. The pressure is regulated such that to reduce the braking torque pressurising medium is released via solenoid valves from the wheel brakes into a reservoir and is pumped back into the master cylinder by the pump, and this causes a pedal movement. Both the pressure increase and pressure drop are controlled by solenoid valves in which pressure transducers are partially used for controlling the solenoid valves. Apart from in the case of EHB, power-assisted braking takes place using vacuum PAB which partially includes switching means and sensors for what is referred to as the brake assist function and also for recognising what is known as the control point. In the case of spark ignition engines the internal-combustion engine is used as the energy source but as a direct injection engine still only supplies a weak vacuum, in particular at the higher level. A mechanical or electrically driven vacuum pump is used in the case of diesel engines. The latest ESP systems are capable of achieving additional power-assisted braking or, in the case of failure of the PAB, power-assisted braking with a higher time constant by switching of the solenoid valves and pumps. The description of these systems and functions is given in detail in the Bremshandbuch (Braking Manual), Vieweg Verlag, 2003 edition.

In the middle of the 1980s Teves used What is known as the Mark II and Bosch the ABS3 which included all components for power-assisted braking and regulation as integrated units with hydraulic PAB, see Kraftfahrtechnisches Handbuch (Automotive Manual) Bosch 1986, 20$^{th}$ edition. Except for use in armoured vehicles, these systems did not establish themselves for cost reasons. The same applies to completely electromechanical braking systems, known as EMB, with electric motors at the wheel brakes, which were intensively developed in conjunction with the 42 volt on-board electrical system. Apart from the additional costs a new, redundant on-board electrical system is required in this case for the energy supply in order to ensure the braking capacity of a brake circuit in the event of a fault.

Wedge brakes with electromotive drive also belong to this type of EMB system. A redundant on-board electrical system is still required in this case despite the lower energy requirement. The constructional implementation of the wedge brake, which requires additional rollers for hysteresis reasons, which in turn require integration in the calliper, has not yet been achieved. The wedge brake with its electromotive drives with sensors has to be able to withstand the harsh ambient conditions (dust, water, high temperatures).

The systems for PAB and HU have been very widely developed, in particular the control and regulating functions for ABS to ESP. For example, by way of pressure-guided control of the solenoid valves very fine regulation of the brake pressure is possible with which a variable brake force adjustment—electronic brake force distribution—is possible. The pressure reduction speed is still not optimal since it is highly non-linear. The pressure reduction speed is also determined by the relatively low pumping level in the case of a μ-jump or with a low coefficient of friction, and this leads to large deviations and results therewith in a braking distance loss.

A generic brake system is known from DE 3342552. In this brake system the master cylinder is used to generate a pedal-dependant pressure that is used as a reference variable for an electronic control and regulating device which regulates the initial pressure of an electrohydraulic servo device directly connected to the brake circuit to a value determined by the reference variable. In the case of failure of the regulating device or the servo device itself the pressure in the brake circuit is generated by the master cylinder. Instead of the reference variable generated by means of the master cylinder during normal operation, it is possible to allow a reference variable generated within the framework of an antilock braking system or within the framework of a slip regulation of the drive regulation of the motor vehicle to act on the electronic control and regulating device and therewith on the electrohydraulic servo device. The servo device comprises an electrically actuated hydraulic piston-cylinder unit, of which the working chamber is connected to the brake circuit and of which the piston can be axially adjusted by means of an electric motor. The rotary movement of the electric motor is converted into a longitudinal movement of the piston via a spindle connected to the piston.

OBJECT OF THE INVENTION

The present invention has the object of providing a novel brake system which is small and compact in its dimensions.

This object is advantageously achieved by a brake system with the features of claim 1. Further advantageous embodiments of the brake system according to claim 1 emerge by way of the features of the subclaims.

The brake system according to the invention is advantageously characterised in that it implements power-assisted braking and the servo device in the smallest space per brake circuit by means of just one piston-cylinder unit. The piston-cylinder unit is also used for building up and reducing the brake pressure, to implement the ABS and antislip regulation and in the case of failure of the energy supply or malfunctioning of the drive device. A small, integrated and inexpensive modular unit is thus advantageously produced for power-assisted braking (PAB) and regulation, whereby this is accompanied by a reduction in installation space, assembly costs and additional hydraulic and vacuum connecting lines. Moreover, owing to the short overall length, the spring dome for example advantageously does not act on the master cylinder and the crank gear in the event of a front impact.

The advantageous provision of sensor system and a travel simulator means that a variable pedal characteristic, such as a brake-by-wire function, i.e. increase in brake pressure, can be freely variably adjusted independently of pedal actuation, even when the braking effect of the generator is taken into account in the case of recuperable brakes.

Furthermore with an appropriate configuration there is no disadvantageous failure of the brake pedal if the drive fails since the pedal acts directly on the piston of the system. Lower pedal forces also advantageously result hereby in the case of failure of the energy supply since the pistons have a smaller effective area than conventional master cylinders. This is possible by separating the piston travel in the case of faultless and failed boosting. This is called a gear jump which reduces the pedal force for the same braking effect by up to 40%. Reducing the overall complexity, including that of the electrical connections, advantageously results in a reduction in the failure rate moreover.

An improvement in the ABS/ESP regulation by finely regulated pressure control with variable pressure increase and, in particular pressure reduction, speeds can also be achieved by the electromotive drive. A pressure reduction to below 1 bar in the region of a vacuum is also possible for operation with the smallest coefficients of friction, for example wet ice. A rapid increase in pressure at the start of braking, for example 0 to 100 bar, can also be achieved in less than 50 ms, and this results in a considerable reduction in braking distance.

The brake system according to the invention requires much less energy owing to the advantageous provision of a 2/2-way valve for power-assisted braking and the regulating function.

The valves, together with the hydraulic lines, should be constructed with the smallest possible flow resistance, i.e. large flow-cross sections, so an optimally fast and variable pressure build-up or reduction can advantageously be achieved by means of the piston-cylinder system(s) since the valves in particular, and also the connecting channels and pipeline, no longer have a throttling effect in this case. This ensures that solely the piston-cylinder system determines the pressure build-up and pressure reduction speeds.

It is also possible to provide a separate piston-cylinder system with associated drive respectively for each brake circuit or each wheel brake. It is also possible to use a piston-cylinder system in which two pistons are axially displaceably arranged in one cylinder, the cylinders being hydraulically coupled and only one piston being electromotively driven mechanically by the drive device.

These embodiments show that the design with the fast and variably regulated electromotive piston drive and the solenoid valve with evaluation of the pressure and performance data presents a high potential for the regulator, and this allows additional braking distance reductions and driving stability.

Pressure-equalised seat valves or sliding valves with low temperature dependency and a short switching time should advantageously be provided, so shorter idle times, and therewith short clock times, may be achieved.

The brake system should also be activated using a control-engineering method in such a way that optimally short changeover times result, i.e. a changeover can be made optimally quickly to a different control channel or a different wheel brake in order to activate it. In this connection it has proven to be advantageous if the signals for the next wheel brake to be adjusted are evaluated as early as during adjustment of a pressure for one wheel brake, so once the regulating process for the first wheel brake is completed there can be an immediate changeover to the other wheel brake.

The invention discloses a specific method for controlling constant and variable gradients by evaluating the pressure-volume characteristic curve of the corresponding brake via piston travel, current or pressure.

It has also proven to be advantageous to provide larger brake tube diameters and heatable brake tubes.

Various embodiments of the brake system according to the invention will be described in more detail hereinafter with reference to drawings, in which:

FIG. 3 shows a travel simulator for the brake system according to the invention;

FIG. 5 shows the basic construction of the brake system according to the invention;

FIGS. 9 to 10a show pressure characteristics and valve positions in the case of pressure reduction;

FIG. 11 shows the progression over time of a plurality of control cycles.

Figure 1:
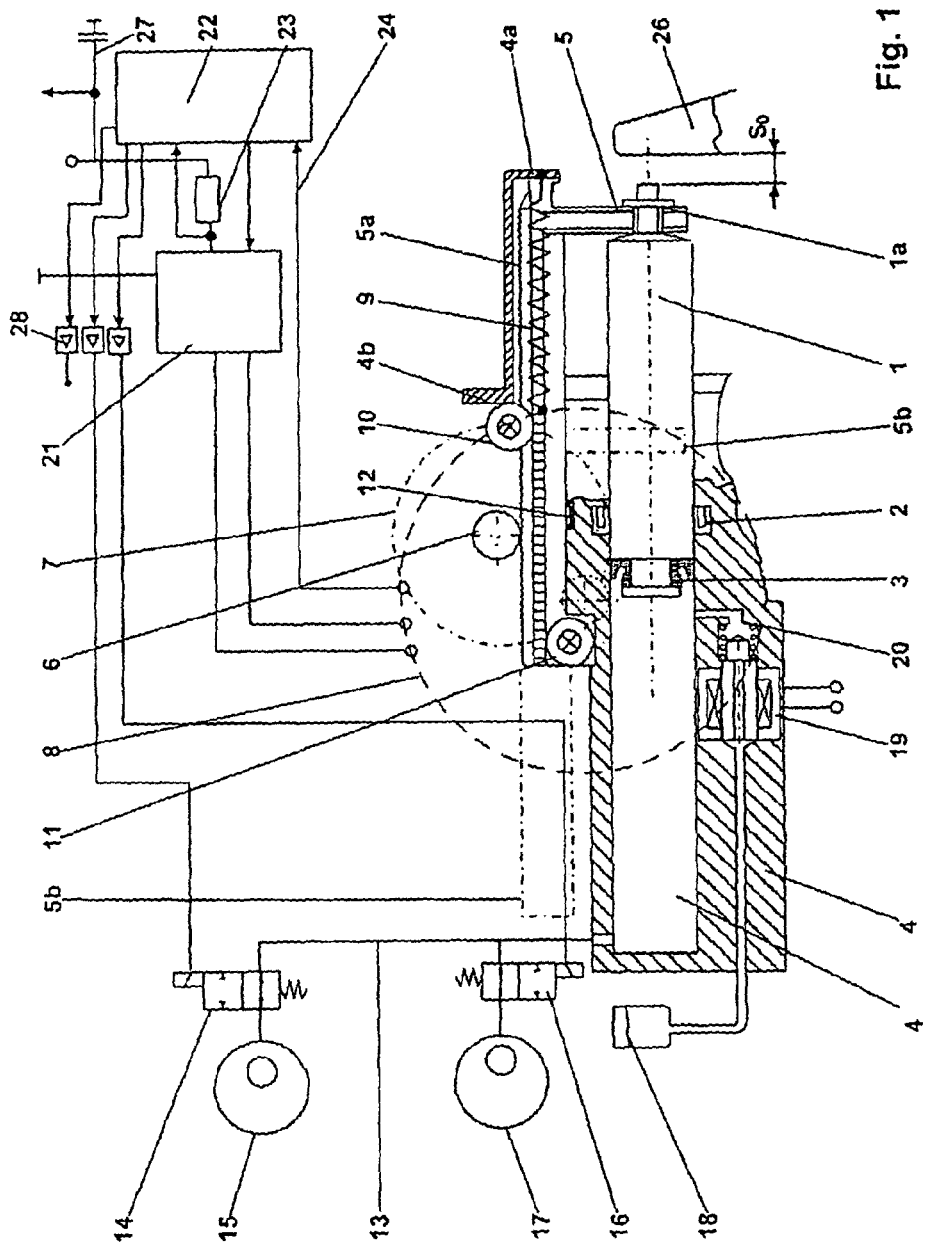
FIG. 1 shows a first embodiment of a brake system with one brake circuit for two wheel brakes.

FIG. 1 shows a detail of the integrated unit which is responsible for generating pressure or power-assisted braking. In this connection the piston 1 with the conventional seals 2 and 3 is moved in the cylinder housing 4 parallel to the piston via a specially designed toothed rack 5a. The seal 2 is designed in such a way that it also provides a seal in the case of a vacuum in the piston chamber 4'. This toothed rack 5a transmits the force to the leading, crowned end of the piston 1. At this location it has a collar stud 1a via which the toothed rack 5a, with restoring spring 9, brings the piston into the starting position. In this case the toothed rack adjoins the cylinder housing 4a. This external spring has the advantage that the cylinder has a short design and little clearance volume, and this is advantageous for ventilation. Owing to the lateral forces the toothed rack is mounted in the rollers 10 and 11 with a slider 12. FIG. 1 clearly shows that the parallel arrangement of the toothed rack with respect to the piston results in a short overall length. The modular unit must be very short in order to be outside of the crash zone. The toothed rack should be constructed in particular by means of a very deflection-resistant H-profile for this purpose. The arrangement of the rollers is selected such that in the end position 5b (shown in broken lines) with the greatest bending force, the toothed rack has a relatively small bending length owing to the compressive force that acts in an offset manner. The toothed rack is driven by toothed profile 5a' and toothed wheel 6 via the gearwheel 7 by the pinion of the motor 8. This motor with a small time constant is preferably a brushless motor as a drag-cup with air-core wiring, or preferably a motor corresponding to PCT patent applications PCT/EP2005/002440 and PCT/

EP2005/002441. It is controlled by the output stages 21, preferably by three branches of a microcontroller (MC) 22. A shunt 23 measures the current for this purpose and a sensor signal 24 and indicates the position of the rotor and, by way of appropriate counters, the position of the piston. The current and position measurement is used, in addition to motor control, for indirect pressure measurement since the motor torque is proportional to the compressive force. For this performance data have to be applied in the vehicle on start-up and during operation, in which data the position of the piston is associated with the various current strengths. During operation a position of the piston is approached in accordance with the booster characteristic curve, described later, which position, according to the performance data, corresponds to a specific pressure. If position and motor torque do not completely match, for example owing to the effect of temperature, the performance data are adapted during operation. The performance data are continuously adapted thereby. The initial performance data are preferably formed from pressure-volume characteristic curves of the wheel brake, motor parameter, gear efficiency and vehicle deceleration. A pedal force-proportional vehicle deceleration can be achieved with the latter, so the driver does not have to adjust to different braking effects.

The piston 1 generates a corresponding pressure in the line 13 which passes via the 2/2-solenoid valve (SV) 14 to the wheel brake 15 or via solenoid valve SV 16 to the wheel brake 17. The described arrangement has several advantages. Instead of the two inexpensive small solenoid valves a further piston-motor unit could be used, as is illustrated in FIG. 4. However this means additional costs, weight and installation space.

It is sufficient to use one piston-motor unit for each brake circuit.

The second advantage is the very small energy requirement and also the configuration of the motor for pulsed operation only. This is achieved by closing the solenoid valves when the desired pressure value or motor torque is attained and the motor is subsequently only operated with low amperage until a new desired value is stipulated by the brake pedal. For this reason the energy requirement or the mean output is extremely low. For example in a conventional configuration the motor 3 would take up a high current in the case of full brake application from 100 km/h. According to the invention the motor requires only about 0.05 s of current for the piston travel, and this accounts for 1.7%. If the values are based on the output, the on-board electrical system would conventionally be loaded with greater than 1,000 watts for a minimum of 3 s and in the case of the proposed pulsed operation only approx. 50 watts mean output. An even greater energy reduction results in the case of full brake application from 250 km/h with braking times of up to 10 s on dry roads. To relieve the impulse loading of the on-board electrical system, a storage capacitor 27 can be used in the current supply in this case and can also be used according to the line with the arrow for the additional electric motors.

Pressure transducers (not shown as they correspond to the prior art) can be used in the pressure line 13 upstream or downstream of the solenoid valve.

The piston 1 is supplied with liquid from the reservoir 18 via the snifting valve. A solenoid valve 19 is inserted in this line. If there is a quick piston movement to reduce the pressure, the seal 3, in particular in the case of low pressures, could snift fluid from the reservoir, and, as is known, this is disadvantageous. For this purpose the low-pressure solenoid valve 19 is closed and the connection to the reservoir broken. This switching can also achieve a vacuum in the wheel circuits 15/17, and this is to the benefit of wheel control in the case of very low coefficients of friction, for example on wet ice, since no braking torque is generated in the wheel brake. On the other hand snifting can be consciously used in the case of vapour bubble formation in which the piston is already at the stop without the corresponding pressure having been attained. In this connection the pistons are appropriately controlled by the solenoid valves, so the oscillating piston builds up pressure. If this function is omitted, a snifting-resistant seal 3 can be used in place of the solenoid valve 19.

The solenoid valves 14, 16, 19 are controlled via output stages 28 by the microcontroller 22.

In the case of failure of the energy supply or the electric motor, the piston is moved by a lever 26 of the actuating device. A clearance is incorporated between the actuating device and the piston and in the event of fast pedal actuation prevents the lever from striking the piston before the motor moves the piston.

The regulating function with respect to the wheel speed and pressure in the case of ABS/ASR, or yaw rate and wheel pressure in the case of ESP, has been illustrated in various publications, so it will not be described again here. The essential functions of the new system shall be shown in a table:

| Functions | Electric motor | Pressure Wheel brake 15 | Solenoid valve 14 | Pressure Wheel brake 17 | Solenoid valve 15 |
| --- | --- | --- | --- | --- | --- |
| PAB | On | Build-up | 0 | Build-up | 0 |
| | Partially supplied with current | P = constant | 1 | P = constant | 1 |
| | Partially supplied with current | Reduction | 0 | Reduction | 0 |
| Brake regulation | On | Build-up | 0 | Build-up | 0 |
| | Partially supplied with current | P = constant | 1 | P = constant | 0 |
| | On | Build-up | 0 | P = constant | 1 |
| | Partially supplied with current | Reduction | 0 | P = constant | 1 |
| | Partially supplied with current | Reduction | 0 | Reduction | 0 |

The level of partial supply with current is guided by the pressure increase or reduction speed desired by the PAB or brake regulation. An extremely low time constant of the electric motor, i.e. a temporally quicker torque increase and torque reduction over small, movable masses of the overall drive, is critical for this since the piston speed determines the speed of the change in pressure. Fast and accurate position regulation of the piston is also required for brake regulation. The compressive force emanating from the callipers also assists in the case of fast torque reduction but is small in the case of low pressures. But it is precisely in this case that the speed of the drop in pressure should be high in order to avoid large deviations from the wheel speed, for example on ice.

This concept has a decisive advantage compared with conventional pressure control via solenoid valves since the piston speed determines the speed of the change in pressure. For example with a small differential pressure at the outlet valve that determines pressure reduction, the flow rate, and therewith the pressure reduction speed, is low. As already mentioned, the piston unit can be used separately for each wheel with and without solenoid valve. To utilise the advantages of the low energy consumption the electric motor has to be expanded by a fast electromagnetic brake which is more complex, however. The illustrated design with one piston unit and two solenoid valves is preferable from installation space and cost perspectives. In terms of control engineering however the limitation that in the event of a pressure reduction at one wheel the other wheel cannot build up pressure applies. However since the pressure reduction time is approx. <10% of the pressure build-up time in the control cycle, this limitation does not have an appreciable drawback. The regulating algorithms have to be adjusted accordingly, for example after a phase of constant pressure of opening the solenoid valve the electric motor must be excited with a current with which the appropriate pressure in the wheel brake is associated according to the PAB characteristic curve, or, for example, is 20% greater than the preceding blocking pressure in the control cycle. Alternatively an adaptive pressure level may also be applied, for example even during regulation, which is 20% greater than the highest blocking pressure of the axle or vehicle. The blocking pressure is the pressure at which the wheel is unstable in the case of a relatively high slip.

In terms of control engineering the design also provides new possibilities of pressure reduction. In terms of control engineering the pressure reduction and braking torque reduction are substantially proportional to the rotational acceleration of the wheel, the hysteresis of the seal and inversely proportional to the moment of inertia of the wheel. The size of the required pressure reduction can be calculated respectively from these values and when the SV is closed the piston can already provide the corresponding volume by taking account of the described performance data. If the SV then opens there is a very rapid reduction in pressure almost to vacuum. Underlying this is the fact that owing to appropriate opening cross-sections, the SV, in contrast to current solutions, has a smaller throttling effect. In this connection the pressure can be reduced more quickly than in conventional solutions via a specially provided chamber volume corresponding to the pressure volume characteristic curve. Alternatively a pressure reduction, which is slightly greater than the required pressure reduction, is possible in one chamber volume, for example by way of an appropriate adjusting speed of the piston. For precise control of the pressure reduction a very short switching time is required to close the solenoid valve, and this can preferably be achieved by pre-excitation and/or overexcitation. For special control cases it is also advantageous to bring armatures of the 2/2-solenoid valve into an intermediate position via known PWM methods in order to generate a throttling effect.

The very rapid reduction in pressure can potentially generate pressure variations which retroact on the wheel. To avoid this damaging effect the piston travel, as a further alternative, can be controlled according to, for example, 80% of the required pressure reduction (rapid pressure reduction). The remaining requisite 20% pressure reduction can then take place slowly by way of a subsequently controlled, slow piston movement, or in the alternative with pressure reduction control via solenoid valves by clocking of the solenoid valve and staggered reduction. Damaging wheel vibrations are thus avoided. The slow reduction in pressure can thus be continued until the wheel accelerates again in the case of ABS control.

Very small deviations in the wheel speed are thereby possible. The above-described method can analogously also be applied to the pressure build-up. The speeds of pressure increase can be optimised according to control-engineering criteria. The aim of braking the wheel in the immediate proximity of the maximum frictional force can be achieved thereby and an optimum braking effect can be attained with optimum driving stability.

Special cases of control have been mentioned above in which a throttling effect is advantageous. This is the case for example if a pressure reduction is required in two wheels simultaneously. The throttling effect is advantageous in this case until the setting piston has provided such a large chamber volume that the then subsequently rapid pressure reduction to vacuum can take place from a different pressure level. The procedure may be similar, i.e. if the solenoid valves have an incorporated restrictor in their cross-section and a pressure build-up should take place at both wheel circuits simultaneously. The individual, alternating pressure build-up is preferable however owing to the regulated build-up with evaluation of the performance data and controlled adjusting speed of the piston. The same alternating method can be used as an alternative to that mentioned above with the throttling effect for pressure reduction. As a further possibility the piston can be reversed by a control signal with a lower response level as the control signal for the pressure reduction. According to the prior art this is the signal at which the regulator recognises a blocking tendency and switches the SV to pressure maintenance (see Bremsenhandbuch, pages 52 to 53). This signal is emitted 5 to 10 ms before the pressure reduction signal. The proposed high-speed drive is capable of providing a chamber volume for 10 bar pressure reduction within about 5 ms.

By using the piston position for pressure reduction the regulator can decide whether there is sufficient chamber volume for simultaneous pressure reduction of both wheel brakes.

Figure 2:
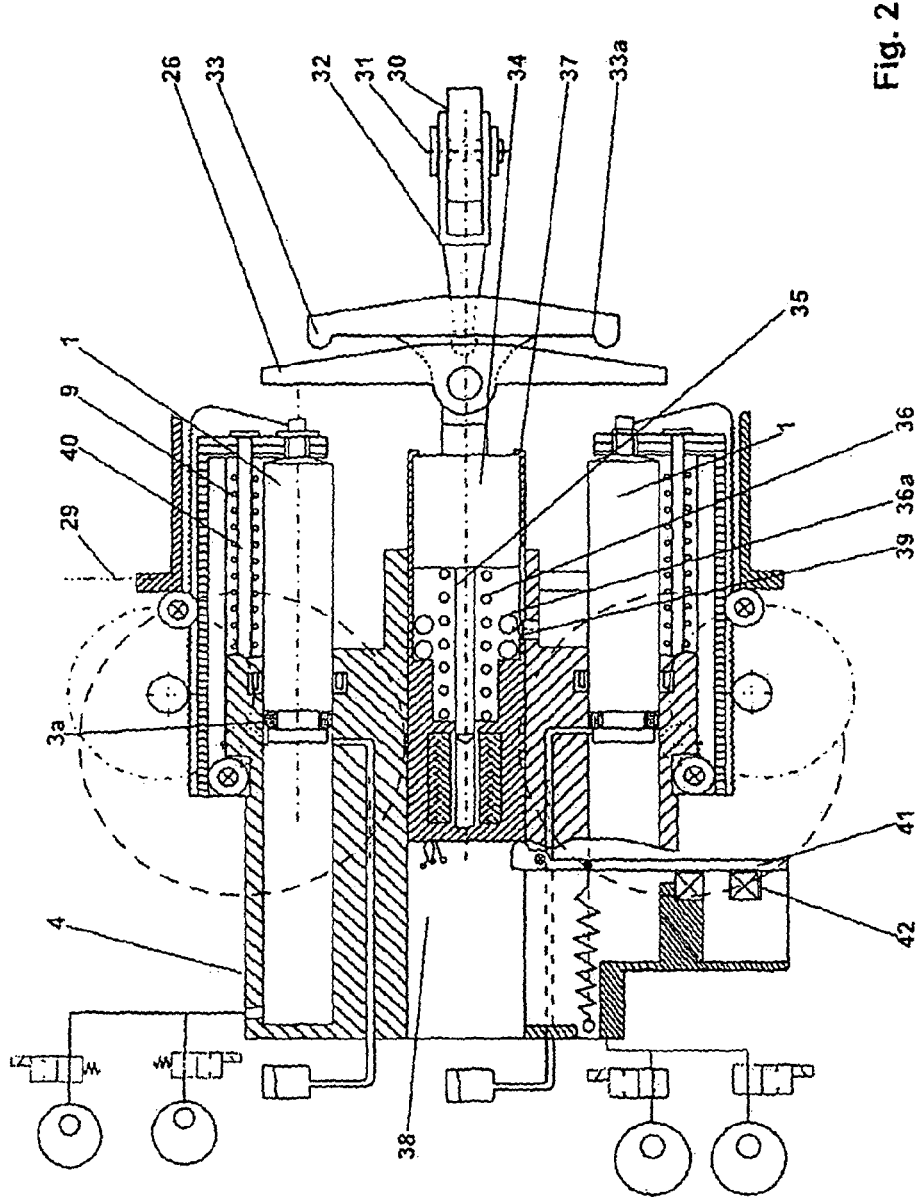
FIG. 2 shows a second embodiment of the brake system with two piston-cylinder systems for two brake circuits for two wheel brakes respectively.

FIG. 2 shows the overall integrated unit for PAB and control functions. The unit comprises two piston units with associated electric motors and gears according to FIG. 1 for two brake circuits and four wheel brakes. The piston units are accommodated in the housing 4. This housing is secured to the end wall 29.

The brake pedal 30 transmits the pedal force and movement via the bearing pins 31 to a fork 32 which acts on the actuating device 33 via a ball-and-socket joint. The actuating device has a cylindrical projection 34 with a rod 35.

Cylinder 34 and rod 35 are mounted in a bush 37. This receives the travel simulator springs 36 and 36a, one spring having a weak effect and the other spring having a force increase with a markedly progressive effect. The travel simulator can also be constructed from even more springs or rubber elements. This predefines the pedal force characteristic. The pedal travel is detected by a sensor 38 which in the illustrated example is constructed according to the eddy current principle in which the rod 35 submerges with a target.

The pedal movement is transmitted to the elements 32 and 33, the piston 34 moves with the rod 35 in the bush 37. A lever 26 is rotatably mounted on the actuating device and strikes the piston in the event of failure of the energy supply. The pedal travel sensor supplies the travel signal to the electronic controller which brings about a movement of the piston via the electric motor in accordance with the PAB characteristic curve. A clearance $s_o$ is provided between the lever 26 and the two pistons 1, as is shown in FIG. 1. By way of the stud 39, shown offset, the actuating device has an anti-rotation element, and a restoring spring 40, which assists the pedal restoring spring (not shown). According to the prior art a large number of travel simulator solutions is known, some of which are also hydraulically actuated via pistons and are blocked by solenoid valves if the energy supply fails. This solution is complex and subject to hysteresis. Solutions are also known in which the travel simulator path is adopted as a loss path when the piston is actuated to generate brake pressure in the event of failure of the energy supply.

The aim of the invention is a simple solution in which the travel simulator is switched off if the energy supply fails. For this purpose, when the energy supply is faultless a counterforce is exerted on the bush 37 via the armature lever 41 with a high gear ratio and the holding magnets 42, the counterforce being dispensed with if the electrical energy supply fails. To reduce the magnets two-stage levers may also be used. This is described in detail in FIG. 3. In this case the lever, after passing through the clearance $s_o$, comes into contact with the two pistons via the brake pedal and can transmit the pedal force to the pistons. The pistons are dimensioned in such a way that in the case of full pedal travel they generate a pressure which still results in a good braking effect, for example 80%. The piston stroke is considerably greater than the pedal travel however and with a faultless energy supply and electrical drive can generate much higher brake pressures. The driver cannot apply the corresponding pedal force however. In the case of this design this is called a gear jump and it is possible by decoupling the actuating unit with travel simulator from the piston. With a conventional construction in which the PAB and master cylinder with piston are connected in series, the required pedal force increases up to a factor of 5 for the same wheel brake pressure if the energy supply fails. In the new design the factor can be reduced to 3 for example. This case is relevant for example when towing a vehicle when the battery has failed.

The lever 26 is rotatably mounted, so it can take account of tolerances in the movement of the pistons, for example owing to varying ventilation. This compensation can also be limited, so the lever comes to rest on a stop 33a of the actuating device.

Even more faults have to be considered, however.

Failure of an Electric Motor.

In this case the boost and regulation in the adjacent, faultless piston drive is fully active. Brake pressure is generated in the failed circuit via the lever 26, since the lever rests on the stop 33a. In this case the booster characteristic curve of the second circuit can also be increased, and this reduces the required pedal force. This can however also take place without a stop.

Failure of a Brake Circuit.

In this case the piston moves toward the stop in the housing 4. The faultless second circuit is fully active. A failing pedal, which, as is known, the driver finds very irritating, does not result as in current conventional systems. The irritation can also lead to complete loss of braking effect if the driver does not depress the pedal.

FIG. 3 describes the function of the travel simulator locking device. In a borderline case the driver can apply high pedal forces, and this has to apply the locking device via the armature lever 41. To avoid the magnet 42 with excitation coil 43 having to fully apply these forces, the upper, crowned end 41a of the lever acts asymmetrically on the bush 37. If the pedal is accordingly moved until the rod 35 meets the floor 37b then this lever effect brings about a slight rotation of the bush 37, and this generates friction in the guide, it being possible for the lug 37a to also be supported on the housing 4. The magnetic force can thus be kept relatively low. The magnet is also configured as a magnetic clamp 42, so a low holding capacity is required owing to the small air gap. If the energy supply fails the armature lever 41 is moved by the bush 37 into the position 41' indicated by dot-dash lines. If the actuating device 33 returns to the starting position again, the restoring spring 44 brings the armature lever back to the starting position.

Figure 6:
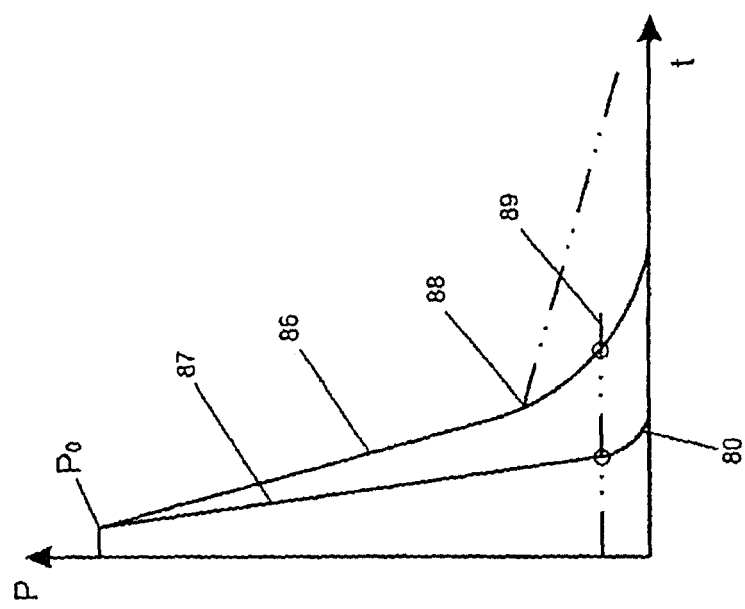
FIG. 6 shows the pressure course during pressure reduction from a level $P_0$, which corresponds for example to the blocking limit of dry roads, for conventional brake systems and brake systems according to the invention.

The sensor 38 has been moved to the end of the hole in the bush in the housing 4, and this has advantages for contact with the electric controller, as is shown in FIG. 6. The same applies to the brake light switch 46. The target 45 for the eddy current sensor is illustrated in this embodiment.

Figure 7:
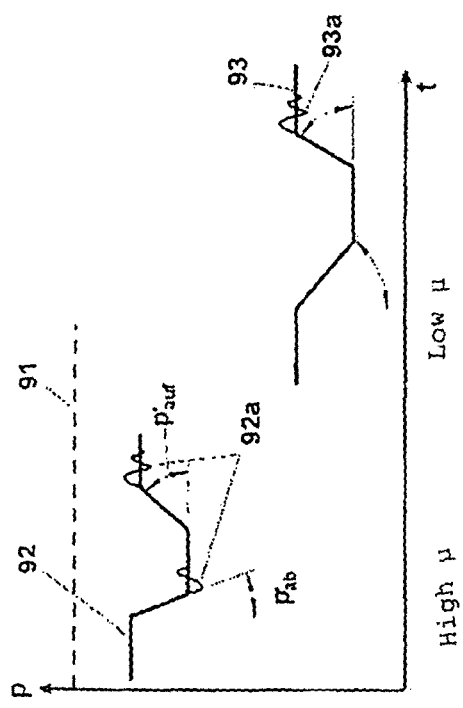
FIG. 7 shows pressure reduction and build-up in the case of high and low μ for conventional brake systems.

Locking of the travel simulator via the bush 37 can be modified in order to avoid the pedal reaction, described in FIG. 7, in the case of ABS. For this purpose the lever 41 with its mounting and magnet 42 with receiver 42a can be moved by an electric motor 60 which drives a spindle 60a via a gearing 60b. The lever is mounted on the extension of the spindle and secures the magnet housing.

FIG. 4 shows a basic illustration of a solution with only one electric motor 7a. This description builds on FIG. 1 and FIG. 2. The drive pinion of the motor moves the toothed rack 5c, which, similar to as in FIG. 1, can also be offset in parallel. The toothed rack is connected to a piston 1a which builds up pressure in the brake circuit 13a and via the pressure simultaneously displaces the piston 1a, which builds up pressure in brake circuit 13. The piston arrangement corresponds to a conventional master cylinder, for the piston and seal designs, of which there exist many variations. As in the above figures, the 2/2-way solenoid valves 14, 14a, 15, 15a are arranged in the brake circuits. The ABS pressure modulation takes place in the above-described manner. The PAB function takes place via a travel simulation 36 and proximity sensor 38 arranged in parallel. A clearance or idles stroke $s_o$ is also provided in this case between piston 1a and brake pedal. The brake fluid passes from the reservoir 18, 18a into the piston chambers. This arrangement is inexpensive. The dynamic performance of the PAB function in pressure build-up is lower than in the variant with two motors since the electric motor has to apply twice the torque. The redundancy function of the second motor is also dispensed with, as is described in FIG. 7, including a failed pedal in the event of brake circuit failure.

A pressure transducer 73b is arranged in the primary brake circuit 13a. It measures the corresponding brake pressure. Since the pressure of this circuit acts via the piston 1b on the second brake circuit 13 as well, this pressure transducer 73b can detect both brake circuits in the case of modulation since during pressure modulation for the ABS function each wheel brake can be individually regulated via the 2/2-solenoid valves 14, 14a, 15, 15a. The pressure and the pressure reduction of each wheel brake can thus be measured.

Figure 4A:
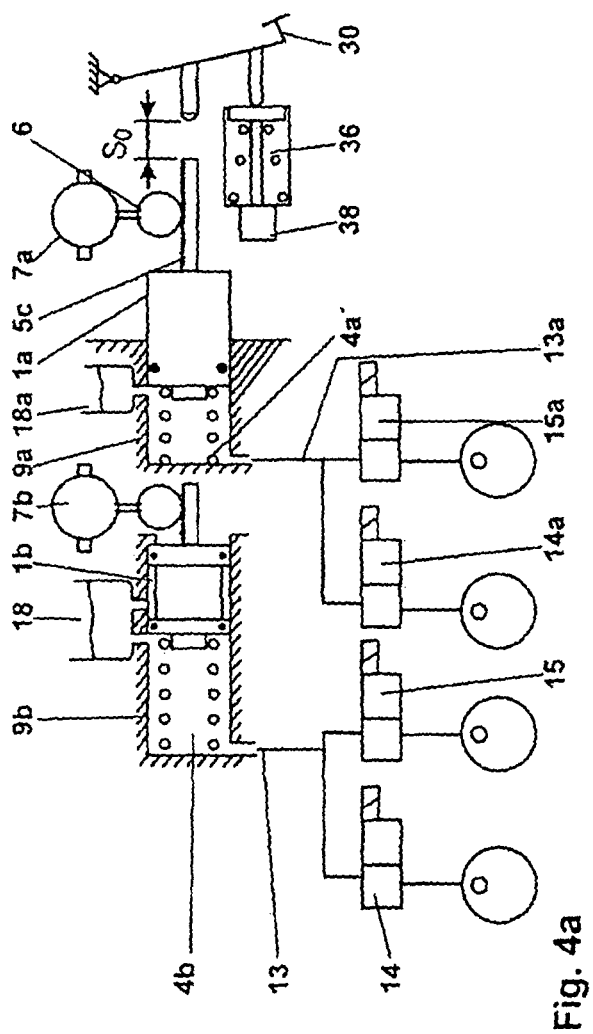
FIG. 4 shows a third embodiment of a brake system, the piston-cylinder system comprising one cylinder and two pistons.

In FIG. 4a each brake circuit 13, 13a has a separate drive 7a, 7b for the corresponding pressure modulating pistons 1a and 1b. In contrast to FIG. 2 the drive 7b is not connected to the brake pedal 30. The two drives are preferably arranged parallel so a short overall length may be achieved. Apart from the short overall length the advantage of this arrangement lies in the simpler construction and modularity. In this connection it is assumed that for small cars to sophisticated mid-size cars the system corresponding to FIG. 4 is used and only in the case of heavy vehicles is a single drive motor no longer sufficient and is therefore divided into two drives. A pressure transducer can be inserted in each brake circuit upstream of the solenoid valves as a function of the requirements.

FIG. 5 shows the pressure modulating device described in FIGS. 1 and 2 which includes an electric motor 8 that is controlled by the shunt 23 for pressure-proportional current measurement over output stages 21. The latter are shown simplified. The piston travel is detected by an angle of rotation sensor 72 or a piston travel sensor 74 which is also used for motor control in an EC motor. This motor actuates the piston which moves the pressurising medium toward the corresponding wheel brakes via the 2/2-solenoid valves 14, 14a. The corresponding brake fluid reservoir 18 is connected to the piston housing. An inexpensive central actuating device can also be used for four wheel brakes and also 2/2-solenoid valves 14' and 14'a. To control the piston, a piston travel sensor 74 or a proximity sensor or angle of rotation sensor can be used in the wheel circuits together with pressure transducers 73 and 73a.

With ABS, EHB- and ESP systems the solenoid valves are constructed as throttle valves for pressure regulation and pressure build-up and reduction (ATZ Automobiltechnische Zeitung 101 (1999) 4 page 224). Basically the aim is to make the pressure build-up and reduction gradients $$\frac{dp}{dt}$$

as high as possible, so the braking torque excess is quickly compensated during regulation. However, the solenoid valves used in the prior art have idle times, and this means that after the adjusting command—for example closing—there is an additional change in pressure. As a rule this is approximately 3 bar if the gradient is 1,500 bar/s and there is a switching time of 2 ms. This closing process causes pressure variations inter alia which have an effect on the wheel behaviour and cause adverse noises inter alia. This means that with their switching characteristic the solenoid valves determine the maximum gradients for pressure reduction and build-up. The fixed throttle resistance of the valves used means that the pressure build-up and reduction gradients are highly non-linear and approximately follow the function $\sqrt{\Delta_p}$, $\Delta_p$ being the differential pressure. A variable and constant pressure gradient is advantageous for optimum and simple regulation however.

It is essential to the invention that the construction and dimensioning of the 2/2-solenoid valves is such that they have virtually no throttling effect, so the actuating device determines the pressure gradient. Pressure-relieved seat valves with low temperature dependency are preferably used.

Knowledge of the pressure-volume characteristic curve of the wheel brake, as is shown in FIG. 5a, is important for gradient control. The upper portion shows the dependency of pressure (current) over volume absorption which is proportional to the piston travel or angle of rotation ax. As is known this is non-linear. For constant pressure gradient control the pressure volume characteristic curve has to be evaluated for corresponding speed control of the piston.

For the method in which a plurality of control channels are operated by a central actuating device it is very important to make the dwell time at a control channel as short as possible since the other control channels are not served during this time. In this connection a rapid pressure gradient, in particular in pressure build-up, is very important, as is a short switching time of the 2/2-solenoid valves. This is described in more details in the following figures.

FIG. 6 describes the pressure reduction from a level $P_0$ which corresponds for example to the blocking limit of dry roads. In the case of a μ-jump on ice or aqua planning the pressure level has to be reduced to the level of line 89. In the systems mentioned in the introduction the pressure is non-linearly reduced according to line 86, with very low gradients at a low pressure level. In systems with storage chambers according to the prior art, these fill at 88. The very slow pressure characteristic, shown in broken lines, is determined by the capacity of the return pump. By contrast the system according to the proposed invention brings about an almost constant gradient—line 87, which, depending on the construction, can be selected so as to be greater or higher than in conventional systems (line 86). Only in the lower characteristic at very low pressures 80 does a transition region, caused by the adjusting speed of the piston, exist. Critical to this advantageous pressure reduction is the dimensioning of the solenoid valves and pipelines which should not form any appreciable flow resistance for the corresponding pressure gradients even at low temperatures, so only the adjusting speed of the piston is dominant. A larger diameter can be used for the brake tube or alternatively the brake tube could be electrically heated.

The left-hand side of FIG. 7 shows the pressure reduction and build-up in the case of high μ and the right-hand side in the case of low μ. The broken line is intended to correspond to what is referred to as the admission pressure 91 which the driver generates in the master cylinder. As already illustrated, the pressure reduction gradient $P_{ab}/dt$ depends on the pressure level, and the build-up gradient $p_{au}/dt$ on the difference in pressure from the admission pressure. High differential pressures, and therewith high $p_{au}/dt$, result in particular with regulation at a low pressure level. The valves are clocked With respect to a stepped pressure build-up. Owing to the rapid closing process of the solenoid valve this generates pressure variations 92a and 93a which cause considerable noise and even have an effect on the wheel behaviour.

Figure 7A:
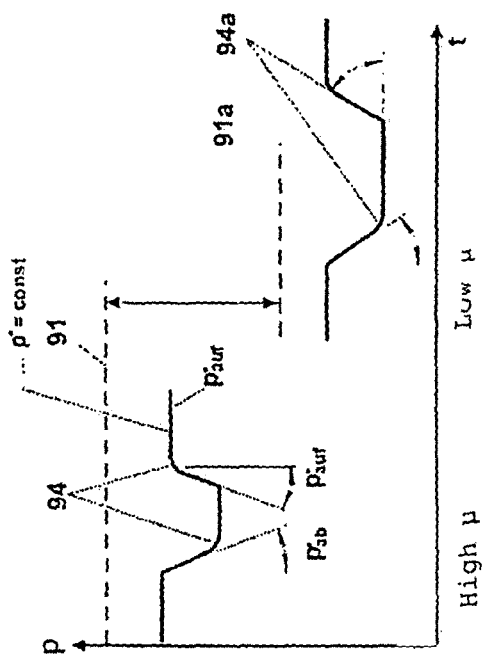
FIG. 7a shows pressure reduction and build-up in the case of high and low μ for brake systems according to the invention.

FIG. 7a shows the pressure-time behaviour in the case of high and low μ in the new system. The pressure gradients $P_{ab}/dt$ and $p_{au}/dt$ can be the same irrespective of the pressure level. The pressure build-up gradient $p_{au}/dt$ can differ within the control cycle, for example during the first pressure build-up $p_{au1}$ can be high and during the second pressure build-up $p_{au2}$ can be lower.

The variable pressure gradients mean that a transition region 94 and 94a can be created in the pressure reduction and build-up, and this avoids pressure variations. The admission pressure of the system, can also be controlled by corresponding control of the actuating member such that the admission pressure is 20% higher than the maximum regulated pressure. This saves electrical energy accordingly for controlling the actuating member.

Figure 8:
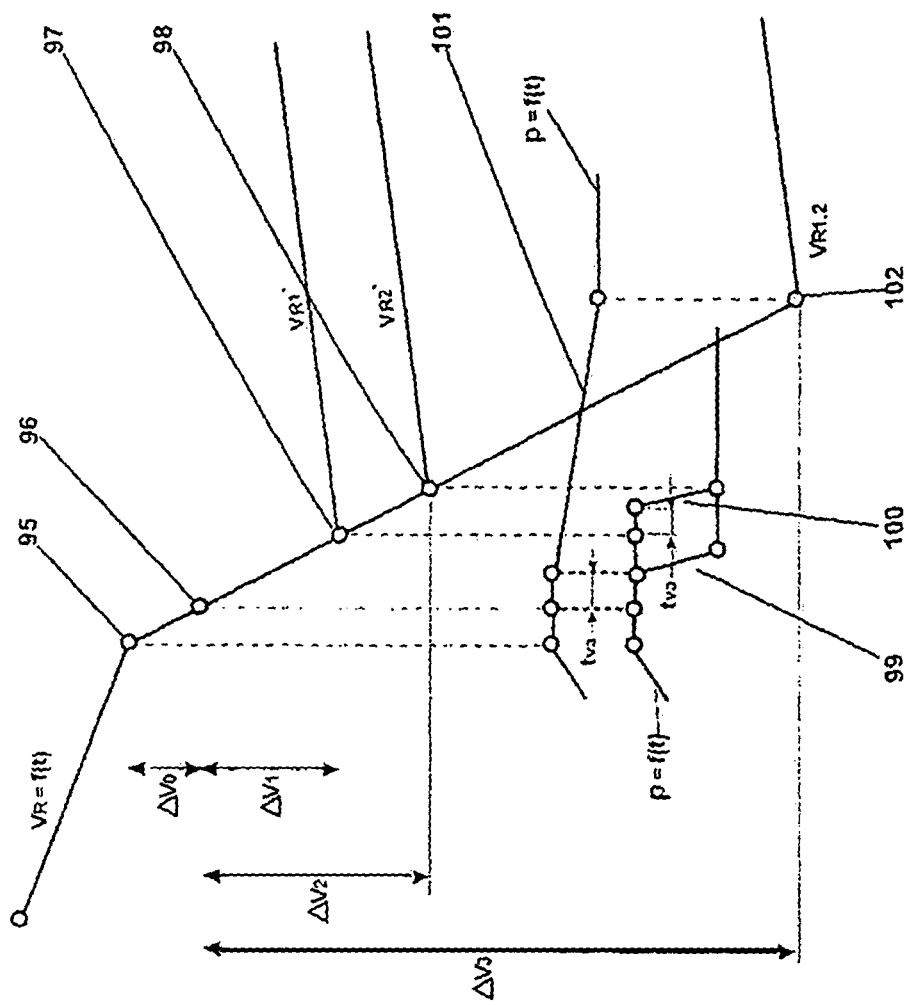
FIG. 8 shows the course over time of wheel speed and pressure in the case of conventional brake systems and brake systems according to the invention.

FIG. 8 shows the course over time of wheel speed and pressure. The curves are highly linearised. During the braking process the wheel speed moves up to point 95 at which the blocking limit is exceeded, and this is expressed by the wheel acceleration $$\frac{d_v}{d_t}$$

increasing. A differential speed $\Delta V_0$ is awaited before the pressure reduction starts. It is expedient to keep the pressure constant during this phase. At instant 96 the pressure is reduced according to characteristic 101 in the conventional system. This takes place after an idle time of $t_{V4}$. In this case the small gradient is accordingly designated small μ. At instant 102 the torque excess, which brings about the blocking tendency, is compensated by corresponding pressure reduction. The wheel speed $V_{R1,2}$ increases again, so the blocking tendency disappears. For the purpose of simplification it is assumed that the two wheel speeds are synchronous and are regulated simultaneously when considering the conventional system. What is referred to as the deviation $\Delta V_3$ is established in this connection in the conventional system.

In the system according to the invention the advantageously rapid pressure reduction also starts at instant 96 after $t_{VA}$ and is completed at 97 and a much lower deviation $\Delta V_1$ results after which the first wheel is no longer blocked ($v_{r1'}$ increases again). A changeover is now made to the second control channel, and after $t_{VA}$ leads to a pressure reduction which is completed at instant 98. A deviation $\Delta V_2$ results in this connection which, despite the offset regulation, is still lower than in the conventional system at $\Delta V_3$.

Even in the new system the pressure can be reduced in two wheels simultaneously during the first control cycle, if the two wheels are instable and exceed point 95/96, because the starting pressure level is the same. This is extremely important since when braking in the case of a high pressure increase speed, the torque excess is greater than in the subsequent control cycles in which the mean pressure increase is significantly smaller as a result of stepped pressure build-up.

As illustrated, in the conventional system deviations that are greater by a factor of 2 to 3 result in the first control cycle, and, as is known, denotes braking distance and lateral force losses.

The above statements show that in the event of simultaneous instability and delayed pressure reduction it is important to keep this time offset as low as possible. It should also be noted however that this case rarely occurs in practice.

FIGS. 9 and 10 show the fundamental influencing parameters on the time offset. The pressure course over time is shown linearised.

The abbreviations denote:

$t_{VA}$: dead or idle time of actuating device or actuator $t_{VH}$: dead time 2/2-solenoid valve $t_c$: scanning time or scanning rate of computer; the computer requires this time in order to calculate the speed in the case of changeover from one wheel to the next $t_{ab}$: pressure reduction time $\Delta t$: time offset In FIG. 9 the adjusting command from the regulator to reduce pressure takes place at 103, identified by a triangle, the reduction taking place after $t_{VA}$ and being completed after $t_{ab}$. In this phase the pressure of the second control channel, shown in broken lines, is kept constant by closing the 2/2-solenoid valves. After $t_{ab}$ at 104, $t_c$ simultaneously acts so as to be $2 \times t_{VM}$. After $t_{VA}$ or simultaneous opening of the 2/2-solenoid valves over $t_{VM}$, the next $p_{ab}$ takes place and after renewed $t_c$ the next change in pressure, and this can bring about a pressure build-up or reduction. It should be noted that the pressure build-up is less critical since the time is longer by a factor of 10 to 20 than $t_{ab}$ in the control cycle since a large number of constant pressure phases, see FIG. 7a, is switched on. From a quantitive perspective the result of FIG. 9 is $\Delta t=17$ ms as the time offset.

FIG. 9a shows one possibility of reducing $\Delta t$. The adjusting command takes place at 103 again. In this connection the required pressure reduction is calculated during $t_{VA}$, predominantly from wheel acceleration and wheel moment of inertia, so after $t_{VA}$ the computer is changed over to the next control channel, so $\Delta t$ is already attained after $t_{ab}$ and $t_{VA}$ or $t_{VM}$ for the next pressure reduction. As shown on the left, $\Delta t$ is reduced from 17 to 12 ms 40% in this connection.

FIGS. 10 and 10a correspond to FIGS. 9 and 9a with the difference that $t_{ab}$ is selected so as to be smaller by a factor of 2, and this means that, using the method of FIG. 9a, $\Delta t$ can be reduced from 17 ms to 7 ms. This is such a small value that the time offset is negligible in the deviation and allows four control channels to be served by one actuator. Further potential is utilisable in reducing the dead and idle times $t_{VA}$ and $t_{VM}$.

As illustrated, $t_{VA}$ and the pressure reduction speed critically determine the changeover time $\Delta t$, i.e. $t_{VA}$ should be small and the pressure reduction speed as high as possible.

The idle time of the 2/2-solenoid valves can vary within certain limits since a short switching delay in pressure reduction is not noticeable as the piston is already moved by the control signal. As soon as the solenoid valve opens the fluid flows almost without throttling into the piston chamber. The end of pressure reduction can be identified from the performance data and can be taken into account in a corresponding rate action. During pressure build-up the EC motor is activated slightly earlier than the anticipated opening time of the solenoid valve. The opening time can be identified from the start-up of the motor since it is only when the valve is open that pressurising medium is transferred to the brakes and the piston can move. The activation time must be corrected if necessary. The closing time can be similarly checked.

The instant of the end of pressure build-up is known from the activation algorithm and the performance data. If the envisaged pressure build-up is not attained, the solenoid valve closes prematurely and its activation time undergoes a correction for subsequent closing. After attaining the pressure build-up the motor/piston pauses for a short time in order to ensure that the solenoid valve is closed.

FIG. 11 describes the progression over time of a plurality of control cycles. The speed characteristic of two wheels $V_{R1}$ and $V_{R2}$ with associated pressure characteristic $p_1$ and $p_2$ is shown. The pressure increase is shown. A differential speed of $V_{R1}$ and $V_{R2}$ from the driving speed $V_F$ forms in this case, as is known. This is called slip. What is known as the speed for optimum friction $V_{opt}$, which, as a rule, has a slip of 10%, but can also vary between 5% and 30% for example, is shown. In other words, as a rule, $V_{opt}$ is for example 90% of $V_F$. After the increase in pressure $V_{opt}$ is exceeded at 105 and after the expiry of $\Delta_v$ (see FIG. 8) pressure is reduced at both wheels in the first control cycle since both have the same starting pressure level and exceed $V_{opt}$. According to the method of FIGS. 9a and 10a a pressure reduction is preferably initiated which is proportional to wheel acceleration and moment of inertia and which is different at $V_{R1}$ and $V_{R2}$.

This calculation process is independent of the calculation of the wheel speed or acceleration. The data for the pressure reduction can be stored for example in performance data, so no appreciable processing power/time is required. The pressure reduction is completed at instant 107 in the case of $V_{R1}$ and at 109 in the case of $V_{R2}$. This is established in each case such that the moment of friction at the wheel is greater than the braking torque, so a wheel re-acceleration results. $V_{opt}$ is exceeded at instant 109 in the case of $V_{R1}$ and at 100 in the case of $V_{R2}$. A pressure build-up takes place here, the size of which is again proportional to the wheel acceleration and wheel moment of inertia, compared with the pressure reduction it is slightly reduced, for example 90%.

After phases of keeping the pressure constant over for example 30 ms, a slight pressure build-up of a few bars takes place at 101 respectively. This can be selected so as to be higher however if the wheel has low slip values.

The next pressure reduction takes place in the case of $V_{R1}$ at instant 102 to instant 113. At 114 the pressure is built up identically to as at 109 and 100, and at 115 and 116 the pressure is reduced in the case of $V_{R2}$. At instant 119 the relatively high pressure build-up according to 100 and the relatively low pressure build-up according to 111 coincide. The high pressure build-up has priority here; the low pressure build-up takes place with a delay of $t_v$. At instant 117 a high wheel acceleration appears in the case of $V_{R2}$ even with relatively high slip. The result of this is that pressure is built up following the conditions of 100. The same thing takes place again at 119.

The delay times $t_{VA}$ and $t_{VM}$ and processing time $t_c$ have not been considered in this presentation in order to provide a clear illustration.

According to this invention the term "control cycle" is taken to mean the control process which is initiated when the speed for optimum friction is not attained or a corresponding slip value is exceeded, see point 105 or 106 of FIG. 11, the pressure reduction. The end of the "control cycle" is given—see point 109 or 110 of FIG. 11—if the speed for optimum friction is exceeded or the slip value is not attained again. A "control cycle" for a wheel brake therefore always comprises a phase in which pressure is built up or reduced and a subsequent phase in which the pressure is kept constant.

The invention claimed is:

1. A brake system comprising an actuating device and a control and regulating device, at least one electromotive drive device, and a valve, the control and regulating device being configured to control the at least one electromotive drive device using the movement and/or position of the actuating device, the drive device being configured to adjust a piston of a piston-cylinder system via a non-hydraulic gearing device to adjust pressure in the working chamber of the cylinder, the working chamber being connected to a wheel brake by a pressure line; wherein the valve is arranged between the brake cylinder of the wheel brake and the working chamber of the piston-cylinder system; wherein the control and regulating device is further configured to open the valve for both pressure reduction and pressure build-up in the brake cylinder and to close the valve to maintain the pressure in the brake cylinder; wherein the brake system is configured to adjust the pressure in one or more brake cylinders, by means of the piston-cylinder system and the valves associated with the wheel brakes, in which the piston of the piston-cylinder system is configured for adjusting the pressure in the one or more brake cylinders during both normal operation and during implementation of anti-lock braking and anti-slip regulation; and wherein the brake system is further configured to adjust the speed of change of the pressure build-up and/or pressure reduction in the wheel brakes by means of the piston-cylinder system as a function of the driving state or the brake regulation of the vehicle or the respective wheel to be decelerated, wherein control of one or more pressure gradients is performed based on an evaluation of at least one pressure-volume characteristic relationship of a respective brake, based on at least one of piston travel, wheel acceleration, current, or pressure.

2. The brake system according to claim 1, wherein the drive device comprises an electromotive or electromechanical drive for adjusting the piston of the piston-cylinder system.

3. The brake system according to claim 1, wherein the drive device drives a piston which, together with a hydraulically coupled further piston, is arranged in a cylinder.

4. The brake system according to claim 3, wherein the brake system comprises a pressure transducer or pressure sensor for detecting the pressure in one of two brake circuits or their pressure lines.

5. The brake system according to claim 4, wherein the controller uses the pressure transducer to adjust the brake pressures far both brake circuits.

6. The brake system according to claim 1, wherein the brake system comprises two piston-cylinder systems arranged parallel to each other, a drive device which adjusts the respectively associated piston being associated with each piston.

7. The brake system according to claim 1, wherein the hydraulic lines connecting the working chamber of the piston-cylinder system to the brake cylinder have a negligible flow resistance.

8. The brake system according to claim 7, wherein the valve has such a flow cross-section that is sufficiently large enough so that the valve does not have a throttling function.

9. The brake system according to claim 7, wherein the valve is a pressure-compensated 2/2 way valve.

10. The brake system according to claim 1, wherein in the case of failure, the actuating device adjusts the at least one piston of the at least one piston-cylinder system directly or via a gearing.

11. The brake system according to claim 1, wherein the pressure in the working chamber of the piston-cylinder system and/or the brake cylinders of the wheel brakes is determined by means of sensors.

12. The brake system according to claim 1, wherein at least sections of the hydraulic lines connecting the wheel brakes to the piston-cylinder system can be heated by means of heating devices.

13. The brake system according to claim 1, wherein the control and regulating device comprises a knowledge base, in the form of performance data, which is constructively adapted.

14. The brake system according to claim 1, wherein each brake circuit comprises a pressure modulating piston which is driven by a separate drive, it being possible to mechanically connect only one pressure modulating piston to the brake pedal.

15. The brake system according to claim 14, wherein the drives and pressure modulating pistons are arranged parallel to each other.

16. The brake system according to claim 1, wherein the pressure in the brake line can be determined by means of a pressure transducer or pressure sensor upstream of each solenoid valve of each brake circuit respectively.

17. A method for adjusting a pressure in at least one brake cylinder of a brake system according to claim 1, the method comprising adjusting, at the same time or successively, the pressure in one or more brake cylinder(s) by means of the at least one piston-cylinder system and the valves associated with the wheel brakes.

18. The method according to claim 17, wherein the speed of change of the pressure build-up and/or pressure reduction in the wheel brakes is adjusted by means of the piston-cylinder system as a function of the driving state or the brake regulation of the vehicle or the respective wheel to be decelerated.

19. The method according to claim 17, wherein the speed of change of the pressure build-up and/or pressure reduction in a wheel brake changes during a control cycle.

20. The method according to claim 19, wherein the speed of change of the pressure build-up and/or pressure reduction during the time in which a valve of wheel brake is open is changed from being high at the start and is reduced toward the end of the pressure reduction or build-up phase.

21. The method according to claim 17, wherein the control and regulating device determines the required pressure build-up, pressure reduction, pressure maintenance phases and/or optimum slip for the respective wheel or all decelerated vehicle wheels at least from the respective wheel speed, vehicle acceleration and the pressure in the respective brake cylinder of the wheel brake.

22. The method according to claim 17, wherein during the pressure build-up or pressure reduction for a first wheel brake, the control and regulating device opens the valve associated with the wheel brake and immediately after adjusting the pressure determined by the regulator for the first brake, closes the valve associated with the first wheel brake and by opening the valve for the second wheel brake adjusts the required pressure for the second wheel brake by means of the piston-cylinder system.

23. The method according to claim 22, wherein the required pressure reduction or pressure build-up for the wheel to be adjusted next is calculated using the measured wheel acceleration and the moment of inertia of the wheel from the performance data.

24. The method according to claim 22, wherein the pressure reduction or pressure build-up to be newly adjusted for the second wheel brake is calculated during adjustment of the pressure for the first wheel brake.

25. The method according to claim 17, wherein the pressure is reduced in the case of two wheel brakes by opening the respectively associated valves at the same time.

26. The method according to claim 25, wherein the valve for a first wheel is more likely to be closed than the valve of the second wheel.

27. The method according to claim 17, wherein the control and regulating device has a memory in which the pressure to be adjusted at the instant the associated valve of a wheel brake is closed and/or the pressure signal is stored.

28. The method according to claim 17, wherein during regulation by means of the piston-cylinder system an admission pressure is adjusted which is approximately 10 to 30% above the pressure to be adjusted.

29. The method according to claim 17, wherein after attaining the pressure buildup, the motor or piston is held in its position for a short time to ensure that the last-opened solenoid valve is completely closed.

30. The method according to claim 17, wherein the response time of the drive device is short to attain a large pressure reduction speed and/or pressure build up speed in such a way that the speed of the change in pressure is greater than 1,500 bar per second.

31. The method according to claim 17, wherein the pressure reduction speed is increased if a plurality of wheels are simultaneously intended for pressure reduction by the regulator.

32. The method according to claim 17, wherein the regulator calculates the optimum pressure to achieve the optimum slip for the decelerated wheel, and the pressure for the associated wheel brake is built up to a pressure which is 1 to 20% lower than the calculated optimum pressure, in such a way that exceeding the optimum slip again is avoided.

33. The method according to claim 32, wherein to achieve an optimum slip the pressure is built up in stages, an initial pressure increase firstly taking place after the control cycle, followed by pressure maintenance phases alternating with pressure build-up phases each with changes in pressure lower than the initial pressure increase.

34. The method according to claim 33, wherein during a pressure maintenance phase for a first wheel, a pressure build-up phase for a second wheel is initiated or carried out by means of the same piston-cylinder system.

35. The method according to claim 17, wherein when activating the valves, the regulating device takes account of their response times or idle times.

36. The method according to claim 17, wherein the regulating device that controls the valves derives the response time of the valves from the reaction of the activated drive device or the piston adjustment travel that has taken place following corresponding activation and stores it in a memory for subsequent control.

37. The method according to claim 17, wherein to build-up or reduce the pressure in at least one wheel brake the piston of the piston-cylinder system is already adjusted and the associated valve(s) subsequently open(s).

38. A brake system comprising:
an actuating device;
a control and regulating device;
at least one electromotive drive device configured to adjust a piston of a piston-cylinder system via a non-hydraulic gearing device so as to increase and decrease a pressure, as needed, in a working chamber of the cylinder of the piston-cylinder system; and
a valve arranged between a brake cylinder of a respective wheel brake and the working chamber of the piston-cylinder system;
wherein the control and regulating device is configured to control the at least one electromotive drive device using movement and/or position of the actuating device;
wherein one or more hydraulic lines are arranged to connect the working chamber of the piston-cylinder system to the brake cylinder;
wherein the control and regulating device is further configured to open the valve for both pressure reduction and pressure build-up in the brake cylinder and to close the valve to maintain pressure in the brake cylinder;
wherein the piston of the piston-cylinder system is configured for adjusting pressure in the brake cylinder during both normal operation and during implementation of anti-lock braking and anti-slip regulation; and
wherein control of one or more pressure gradients is performed based on an evaluation of least one pressure-volume characteristic relationship of a respective brake, based on at least one of piston travel, wheel acceleration, current, pressure.

39. The brake system according to claim 38, wherein the valve comprises a 2/2-sliding valve, and wherein a flow cross-section of the valve is sufficiently large so that the valve does not have a throttling function.

40. The brake system according to claim 38, wherein the valve comprises a pressure-compensated 2/2-way valve.

41. The brake system according to claim 1, wherein the brake system is configured to change speed of change of the pressure build-up and/or pressure reduction in a wheel brake during a control cycle.

42. The brake system according to claim 38, wherein the brake system is configured to change speed of change of the pressure build-up and/or pressure reduction in a wheel brake during a control cycle.

* * * * *